United States Patent [19]

McLean

[11] Patent Number: 5,179,822
[45] Date of Patent: Jan. 19, 1993

[54] AGRICULTURAL MACHINE WITH A CUTTERBAR DRIVEN BY A PAIR OF GENERALLY VERTICAL DRIVE SHAFTS

[75] Inventor: Kenneth W. McLean, New Holland, Pa.

[73] Assignee: Ford New Holland, Inc., New Holland, Pa.

[21] Appl. No.: 753,600

[22] Filed: Sep. 3, 1991

[51] Int. Cl.⁵ .............................................. A01D 34/66
[52] U.S. Cl. ......................................... 56/6; 56/14.7; 56/13.6
[58] Field of Search .................. 56/6, 14.7, 16.4, 13.5, 56/13.6

[56] References Cited

U.S. PATENT DOCUMENTS

| | | | |
|---|---|---|---|
| 3,550,360 | 12/1970 | Van Der Lely | 56/6 |
| 4,199,922 | 4/1980 | Van Der Lely | 56/13.6 |
| 4,719,742 | 1/1988 | Ermacora et al. | 56/13.6 X |
| 4,899,523 | 2/1990 | Frumholtz et al. | 56/13.6 X |

*Primary Examiner*—Terry Lee Melius
*Attorney, Agent, or Firm*—Larry W. Miller; Frank A. Seemar

[57] ABSTRACT

An agricultural machine such as a mower conditioner includes a cutterbar carried by a header that is suspended from a frame. The cutterbar has a plurality of individual cutting units with two end cutting units located adjacent opposed sides of the frame and intermediate cutting units disposed between the end cutting units. Each cutting unit consists of blades pivotally mounted on a rotor. A tongue adapted for connection to a tractor is pivotally connected to the frame intermediate the opposed sides thereof. Input drive shafts deliver power from a power-take-off shaft on the tractor to a pair of generally vertical output drive shafts via a bevel gearbox and a spur gearbox. The generally vertical output drive shafts are connected to two of the intermediate cutting units, and generally horizontal output drive shafts connect these two intermediate cutting units to the other intermediate cutting units and to the end cutting units.

17 Claims, 3 Drawing Sheets

AGRICULTURAL MACHINE WITH A CUTTERBAR DRIVEN BY A PAIR OF GENERALLY VERTICAL DRIVE SHAFTS

FILED OF THE INVENTION

This invention relates generally to agricultural machines and, in particular, to agricultural machines typically referred to as mowers and mower conditioners. More specifically, this invention relates to an agricultural machine with a cutterbar driven by a pair of generally vertical drive shafts.

BACKGROUND OF THE INVENTION

U.S. Pat. No. 4,899,523 to Frumholtz et al discloses a mower having a frame, a tongue pivotally connected to the frame near the center thereof, and a disc cutterbar carried by the frame. The disc cutterbar includes a plurality of individual cutting units arranged side-by-side transversely of the frame. A main drive shaft connected to a power-take-off shaft on a tractor extends through the tongue to an upper input gearbox on the mower frame, and distribution shafts extend outwardly from a lower input gearbox to output gearboxes located adjacent outer ends of the cutterbar. The distribution shafts drive the cutting units located at the outer ends of the cutterbar while the intermediate cutting units are driven by the end cutting units.

A drawback of the mower disclosed in the Frumholtz et al patent is that power from the tractor is transmitted over a relatively long distance through the main drive shaft, the upper and lower input gearboxes, the distribution shafts, and the output gearboxes to the cutterbar. The Frumholtz et al mower has another drawback in that it utilizes four gearboxes (i.e. two input gearboxes and two output gearboxes) in order to drive the cutterbar.

SUMMARY OF THE INVENTION

It is an object of the present invention to provide an agricultural machine, such as a mower or a mower conditioner, that overcomes the drawbacks of the Frumholtz et al mower.

The present invention provides an agricultural machine comprising a frame carrying a cutterbar having a plurality of individual cutting units including a pair of end cutting units located adjacent opposed sides of the frame and two intermediate cutting units disposed between the end cutting units. A tongue is pivotally connected to the frame intermediate the opposed sides of the frame and is adapted for attachment to a tractor. Means for driving the plurality of individual cutting units includes a pair of generally vertical drive shafts connected to the intermediate cutting units and a pair of generally horizontal drive shafts connecting the intermediate cutting units and the end cutting units. The cutting units each comprise blades mounted on a rotor. The driving means comprises an input drive shaft connected to a power-take-off shaft on the tractor, and a bevel gearbox for transmitting power from the input drive shaft to the generally vertical drive shafts. The input drive shaft is connected to an input shaft on the bevel gearbox, and the generally vertical drive shafts each have one end connected to an output shaft on the bevel gearbox. The generally vertical drive shafts each have another end connected to a hub that is fastened to the rotor of one of the intermediate cutting units.

DESCRIPTION OF THE PREFERRED EMBODIMENT

Figure 1:
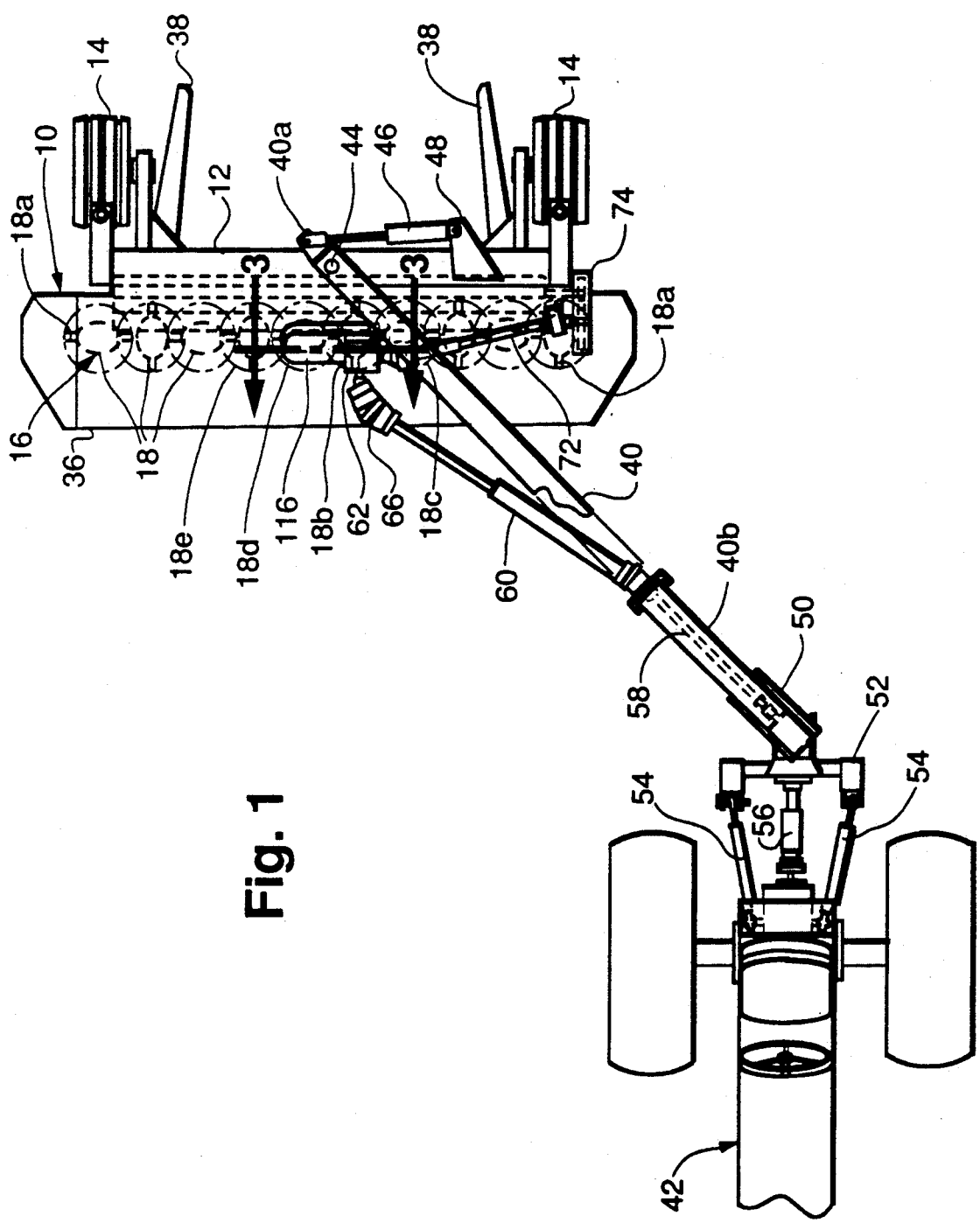
FIG. 1 is a top plan view of a mower conditioner connected to a tractor in accordance with the present invention.
Figure 2:
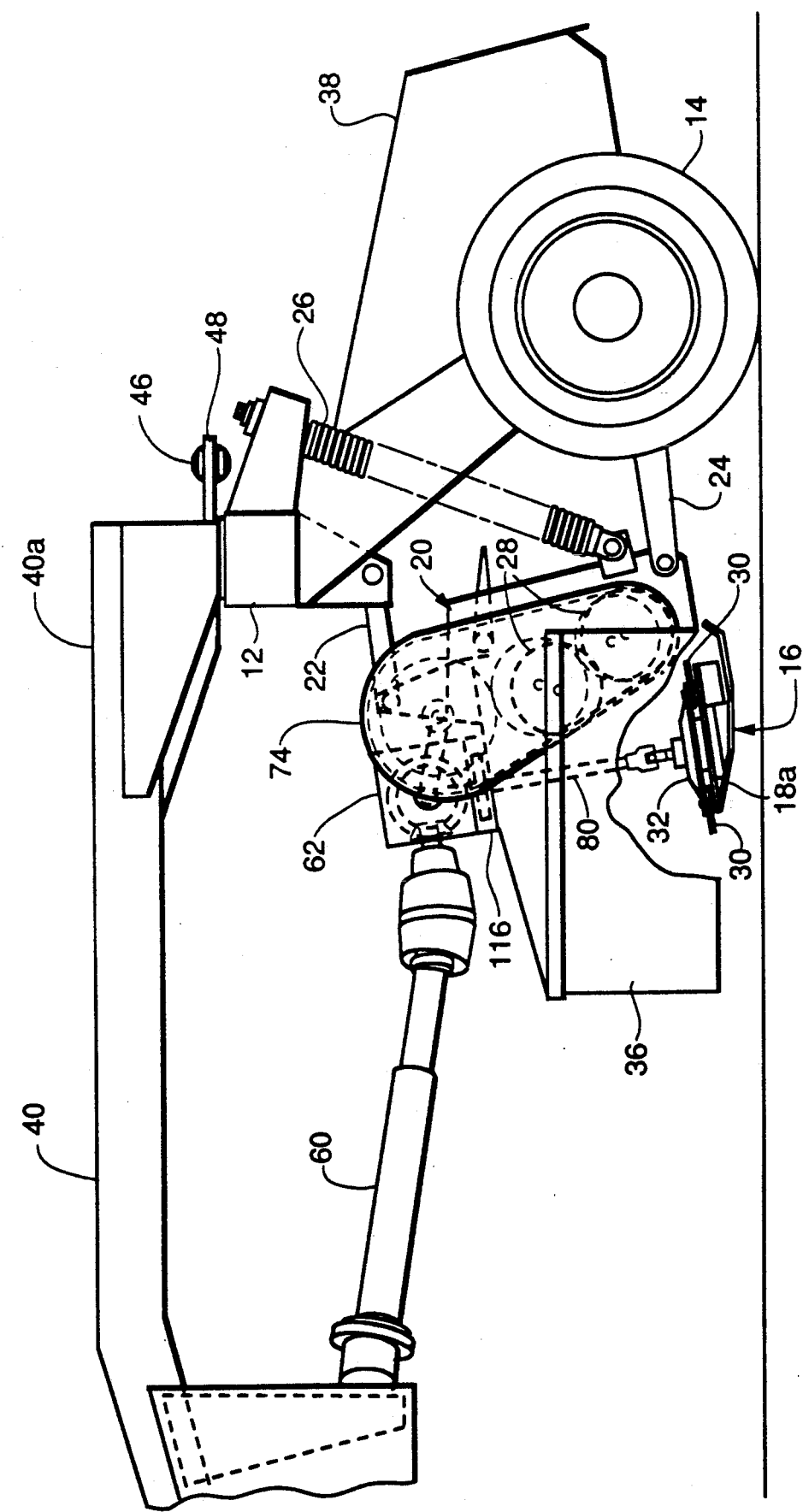
FIG. 2 is an enlarged side elevational view of the mower conditioner shown in FIG. 1.

Referring to FIGS. 1 and 2, a mower conditioner 10 includes a frame 12 supported by a pair of wheels 14. A cutterbar 16 having a plurality of individual cutting units 18 is carried by a header 20 that is suspended from the frame 12 by upper and lower links 22, 24 and springs 26. The cutting units 18 include two end cutting units 18a located adjacent opposed sides of the frame 12. Each of the cutting units 18 includes a pair of blades 30 pivotally mounted on opposite sides of a rotor 32 by bolts 34. A pair of conditioning rolls 28 are mounted in the header 20 substantially rearwardly of the cutterbar 16. The header 20 includes a flexible curtain 36 which is disposed in front of the the cutterbar 16. Crop deflector shields 38 are mounted on the frame 12 behind the header 20.

A tongue 40 is connected between the mower conditioner 10 and a tractor 42. A trailing end 40a of the tongue 40 is pivoted on a post 44 mounted on the mower conditioner frame 12 near the center thereof. A hydraulic cylinder 46 is connected between the trailing end 40a of the tongue 40 and a bracket 48 mounted on the frame 12. The hydraulic cylinder 46 may be extended and retracted to move the tongue 40 between a position where the mower conditioner 10 is disposed on one side of the tractor 42 and another position where the mower conditioner 10 is disposed on the other side of the tractor 42. When the hydraulic cylinder 46 is fully extended, the mower conditioner 10 is swung to the right side of the tractor 42 as shown in FIG. 1, but when the hydraulic cylinder 46 is fully retracted, the mower conditioner 10 is swung to the left side of the tractor 42. The mower conditioner 10 may also be swung into a transport position directly behind the tractor 42 by partially extending the hydraulic cylinder 46.

A swivel hitch 50, such as disclosed in U.S. application Ser. No. 07/708,314 of K. W. McLean et al filed May 31, 1991 and incorporated herein by reference, is attached to a leading end 40b of the tongue 40. The swivel hitch 50 is connected to a yoke assembly 52 which is attached to a pair of lower links 54 on the tractor 42. A power-take-off shaft 56 on the tractor 42 delivers power through input drive shafts 58, 60 to a bevel gearbox 62 mounted on the header 20 of the mower conditioner 10.

Figure 3:
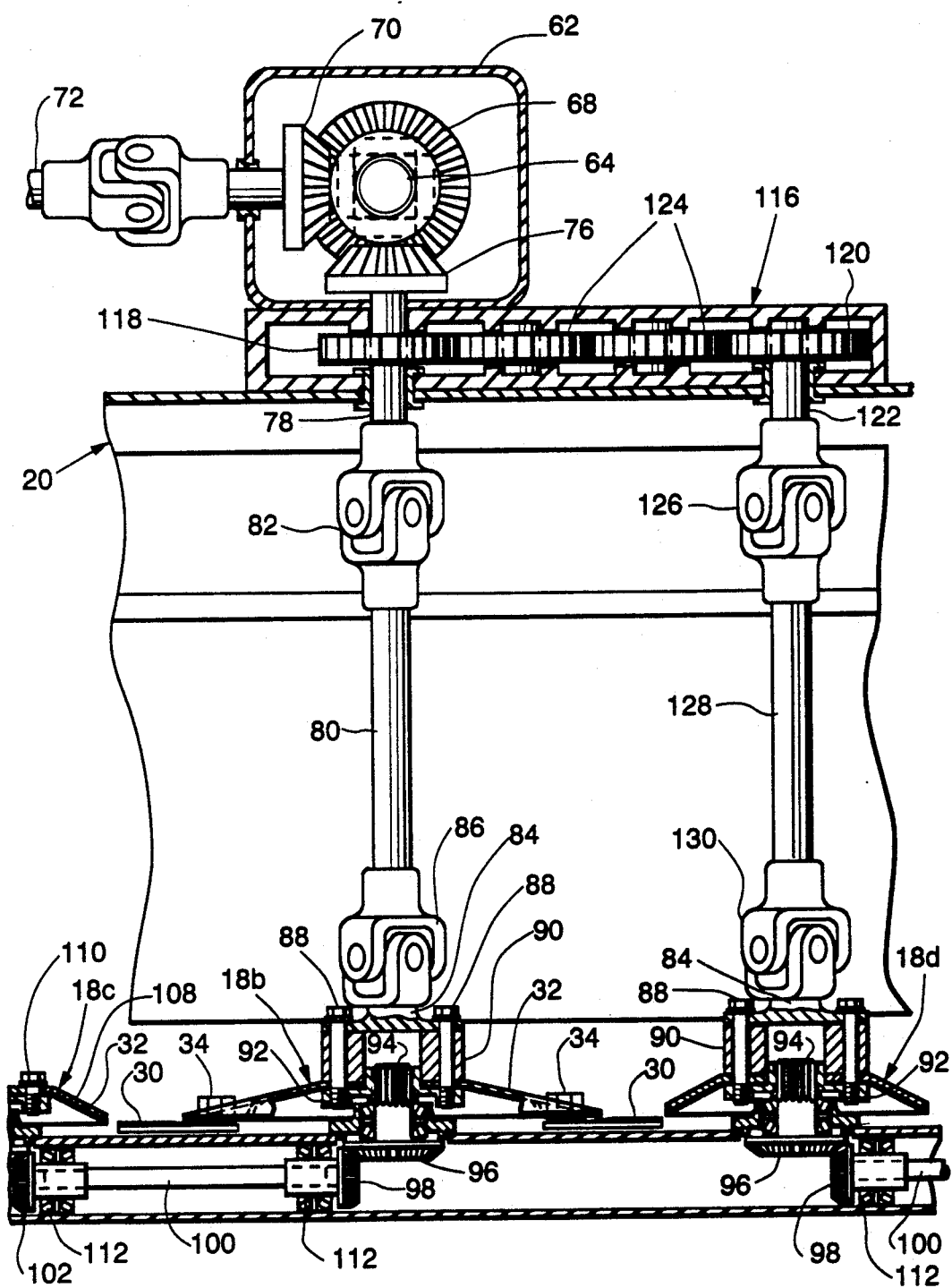
FIG. 3 is a sectional view taken along lines 3—3 in FIG. 1.

Referring now also to FIG. 3, the bevel gearbox 62 has an input shaft 64 that is coupled to the input drive shaft 60 by a universal joint 66. A bevel gear 68 on the input shaft 64 meshes with a bevel gear 70 rotatably mounted in the gearbox 62. The bevel gear 70 rotates an output drive shaft 72 which extends from the gearbox 62 toward one end of the header 20 where it delivers power to a transmission 74 which rotates the conditioning rolls 28. Another bevel gear 76 on a primary output shaft 78 of the gearbox 62 also meshes with the bevel gear 68. A primary output drive shaft 80 has one end connected by a universal joint 82 to the output shaft 78 while the other end of the drive shaft 80 is connected to a hub 84 by another universal joint 86. The primary output drive shaft 80 is disposed in a generally vertical orientation.

Hub 84 is secured to the rotor 32 on an intermediate cutting unit 18b by bolts 88 which extend through a spacer ring 90 into threaded engagement with another hub 92 which has a splined connection with a stub shaft 94. The stub shaft 94 carries a bevel gear 96 that meshes with another bevel gear 98 carried on an output drive shaft 100. The drive shaft 100 is disposed in a generally horizontal orientation and also carries a bevel gear 102 which meshes with another bevel gear mounted on a stub shaft, similar to the arrangement of shaft 94 and gear 96 of cutting unit 18b in a conventional manner, which is splined to a hub 108 that is fastened by bolts 110 to the rotor 32 on an adjacent intermediate cutting unit 18c. Roller bearings 112 rotatably support the drive shafts 100, as well as the various stub shafts.

The primary output shaft 78 of the bevel gearbox 62 extends through a spur gearbox 116 which contains a spur gear 118 that is fixed to the primary output shaft 78 and another spur gear 120 that is fixed to a secondary output shaft 122 for the gearbox 62. A pair of counterrotating spur gears 124 are contained in the spur gearbox 116 and mesh with the spur gears 118, 120 in a conventional manner to cause rotation of the spur gears 118, 120 in opposite directions. The secondary output shaft 122 of the bevel gearbox 62 is connected by a universal joint 126 to one end of a secondary output drive shaft 128. The other end of the secondary output drive shaft 128 is connected by another universal joint 130 to the hub 84 on the intermediate cutting unit 18d. The primary and secondary shafts 80, 128 are preferably rotated in opposite directions.

During operation of the mower conditioner 10, power is delivered from the power-take-off shaft 56 on the tractor 42 through the input drive shafts 58, 60, bevel gearbox 62 and spur gearbox 116 to the output drive shafts 80, 128 which rotate the rotors 32 on the cutting units 18b, 18d. Rotation of these rotors 32 causes rotation of the stub shafts 94 and the output drive shafts 100. Rotation of the drive shafts 100 results in rotation of the stub shafts and associated rotors 32 on the adjacent cutting units 18c, 18e. The rotors 32 on the cutting units 18b, 18d rotate in opposite directions. The rotors 32 on the remaining intermediate cutting units 18 and the end cutting units 18a are driven by further arrangements of drive shafts 100 and associated stub shafts.

What is claimed is:

1. An agricultural machine comprising:
   a frame carrying a cutterbar having a plurality of transversely disposed individual rotatable cutting units divided into two laterally opposed groups of cutting units, each said group of cutting units including a laterally outboard end cutting unit located adjacent opposed sides of said frame and an intermediate cutting unit disposed inwardly of said end cutting unit between the opposing said end cutting units;
   means for rotatably driving said plurality of cutting units including a pair of generally vertical drive shafts connected respectively to said intermediate cutting units to effect rotation thereof and directly drive said intermediate cutting units; and
   power transfer means operably connected to each said vertical drive shaft to transfer rotational power between the operatively connected intermediate cutting unit and the corresponding said end cutting unit for rotatably driving all of said cutting units within the corresponding group of said cutting units.

2. The agricultural machine of claim 1, wherein said cutting units each comprise blades mounted on a rotor.

3. The agricultural machine of claim 2, wherein said driving means comprises an input drive shaft connected to a power-take-off shaft on a tractor, and a bevel gearbox for transmitting power from said input drive shaft to said generally vertical drive shafts.

4. The agricultural machine of claim 3, wherein said input drive shaft is connected to an input shaft on said bevel gearbox and wherein said generally vertical drive shafts each have one end connected to an output shaft on said bevel gearbox.

5. The agricultural machine of claim 4, wherein said generally vertical drive shafts each have another end connected to a hub that is fastened to the rotor of one of said intermediate cutting units.

6. The agricultural machine of claim 1, further comprising conditioning means carried by said frame substantially rearwardly of said cutterbar.

7. The agricultural machine of claim 1, further comprising a tongue pivotally connected to said frame between the opposed sides thereof and adapted for attachment to a tractor.

8. The agricultural machine of claim 7, further comprising means for moving said tongue between a position where the agricultural machine is disposed on one side of the tractor and another position where the agricultural machine is disposed on the other side of the tractor.

9. The agricultural machine of claim 8, wherein said means for moving comprises a hydraulic cylinder connected between said tongue and said frame.

10. The agricultural machine of claim 1, wherein said driving means further comprises a plurality of spur gears for causing rotation of said generally vertical drive shafts in opposite directions.

11. The agricultural machine of claim 1, wherein said power transfer means includes a pair of generally horizontal drive shafts interconnecting said intermediate cutting units to said end cutting units to transfer rotational power therebetween.

12. A motor conditioner comprising:
   a frame supporting a header;
   a transverse cutterbar carried by said header for severing crop material in a field, said cutterbar having a plurality of transversely disposed individual rotatable cutting units divided into two laterally opposing groups of cutting units, each said group of cutting units including a laterally outboard end cutting unit located adjacent opposed sides of said frame and an intermediate cutting unit disposed inwardly of said end cutting unit between the opposing said end cutting units;
   conditioning means mounted in said header substantially rearwardly of said cutterbar for conditioning crop material after it has been severed by said cutterbar;
   a tongue pivotally connected to said frame intermediate the opposed sides of said frame and adapted for attachment to a tractor; and
   means for rotatably driving said cutting units including a pair of generally vertical drive shafts connected respectively to said intermediate cutting units to effect rotation thereof and directly drive said intermediate cutting units and a pair of generally horizontal drive shafts interconnecting the respective one of said intermediate cutting units and the corresponding said end cutting unit to transfer rotational power between the operatively connected intermediate cutting unit and the corresponding said end cutting unit for rotatably driving all of said cutting units within the corresponding group of said cutting units.

13. The mower conditioner of claim 12 wherein the intermediate cutting unit driven directly from the associated vertical drive shaft operatively connected thereto is positioned at an inboard end of the corresponding said group of cutting units.

14. The mower conditioner of claim 13 wherein each said group of cutting units is provided with at least one additional cutting unit positioned transversely between the corresponding said intermediate cutting unit and the corresponding said end cutting unit, said additional cutting unit being driven from the corresponding horizontal drive shaft.

15. The mower conditioner of claim 14 wherein said generally vertical drive shafts are positioned adjacent a longitudinal centerline of said header forwardly of said conditioning means.

16. The mower condition of claim 15 wherein said driving means further includes a gearbox connectable to an input drive shaft operable to deliver rotational power thereto, said gearbox being connected to said generally vertical drive shafts to receive rotational power therefrom.

17. The mower conditioner of claim 16 wherein said gearbox includes a plurality of gears arranged therein to operably drive said generally vertical drive shafts and the associated intermediate cutting units directly driven therefrom in opposite directions, while maintaining the rotational timing therebetween.

* * * * *